(12) United States Patent
Kim et al.

(10) Patent No.: US 6,480,349 B1
(45) Date of Patent: Nov. 12, 2002

(54) DISK DRIVE EMPLOYING A NON-VOLATILE SEMICONDUCTOR MEMORY FOR STORING READ CHANNEL PARAMETER CALIBRATED FOR THE DISK DRIVE USED TO RECOVER DISK CHANNEL PARAMETER

(75) Inventors: Yoo H. Kim, Laguna Niguel, CA (US); Hanan Kupferman, Diamond Bar, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/513,316

(22) Filed: Feb. 25, 2000

(51) Int. Cl.$^7$ ................................................. G11B 5/02
(52) U.S. Cl. ............................. 360/27; 360/31; 360/46
(58) Field of Search ........................... 360/31, 46, 133, 360/48, 27; 324/212, 210, 226; 369/47.1, 47.15, 53.1, 124.01

(56) References Cited

U.S. PATENT DOCUMENTS

| | | | |
|---|---|---|---|
| 5,552,942 A | | 9/1996 | Ziperovich et al. |
| 5,717,887 A | * | 2/1998 | Leslie .......................... 717/173 |
| 5,838,512 A | | 11/1998 | Okazaki |
| 5,880,902 A | | 3/1999 | Yu et al. |
| 6,069,758 A | * | 5/2000 | Chung .......................... 360/31 |
| 6,195,217 B1 | * | 2/2001 | Park ............................. 360/48 |

* cited by examiner

*Primary Examiner*—Alan T. Faber
(74) *Attorney, Agent, or Firm*—Milad G. Shara, Esq.; Howard H. Sheerin, Esq.

(57) ABSTRACT

The present invention may be regarded as a disk drive comprising a disk with a reserved sector for storing a data-sector channel parameter, and a data sector for storing data. The disk drive further comprises a read channel circuit comprising a parameter register, and a non-volatile semiconductor memory (NSM) storing a reserved-sector channel parameter that is selected by using a parameter calibration procedure performed for the disk drive. A disk controller retrieves the reserved-sector channel parameter stored in the NSM, programs the parameter register with the retrieved reserved-sector channel parameter in order to configure the read channel circuit to recover the data-sector channel parameter stored in the reserved sector, and programs the parameter register with the recovered data-sector channel parameter so that the read channel circuit is configured to recover the data stored in the data sector.

9 Claims, 3 Drawing Sheets

DISK DRIVE EMPLOYING A NON-VOLATILE SEMICONDUCTOR MEMORY FOR STORING READ CHANNEL PARAMETER CALIBRATED FOR THE DISK DRIVE USED TO RECOVER DISK CHANNEL PARAMETER

BACKGROUND OF THE INVENTION

1. Field of the Invention

The present invention relates to disk drives for computer systems. More particularly, the present invention relates to a disk drive employing a non-volatile semiconductor memory for storing a read channel parameter calibrated for the disk drive used to recover a disk channel parameter.

2. Description of the Prior Art

As shown in FIG. 1A, a disk drive typically comprises a disk 2 for storing data and a head 4 actuated radially over the disk 2 for writing data to and reading data from the disk 2. The head 4 is connected to an actuator arm 6 which is rotated about a pivot 8 by a voice coil motor (not shown). The data to be written to the disk 2 modulates operation of the head 4 in order to write a series of transitions (magnetic or optical) on the disk surface along the centerline of typically concentric or spiral tracks. When reading data recorded on the disk 2, a special read channel circuit is employed to detect an estimated data sequence from a read signal emanating from the head 4.

An example format for a magnetic disk 2A is illustrated in FIG. 1B as comprising a plurality of concentric tracks 10, wherein each concentric track 10 is partitioned into a plurality of data sectors 12. An example format of a data sector 12 recorded on the magnetic disk 2A is shown in FIG. 1C as comprising a preamble 20, a sync mark 22, a data field 24 and appended ECC symbols 26. The preamble 20 allows the read channel circuit to acquire the appropriate timing and gain information from the read signal before reading the data field 24, and the sync mark 22 demarks the beginning of the data field 24 so that it can be symbol synchronized. The appended ECC symbols 26 are used to detect and correct errors in an estimated data sequence detected by the read channel circuit.

Referring again to FIG. 1B, a plurality of the concentric tracks 10 are banded together to form at least an inner zone 14 and an outer zone 16, and at least one of the sectors 12 is a reserved sector for storing calibrated data-sector channel parameters. The magnetic disk 2A is partitioned into a plurality of zones in order to achieve a more constant linear bit density from the inner diameter to outer diameter tracks, thereby exploiting the maximum storage capacity of the disk by increasing the data rate from the inner to outer diameter zones. The changing data rate between zones, however, militates the need to calibrate the read channel in order to operate more optimally in each zone. Thus, disk drives typically reserve at least one sector for storing calibrated data-sector channel parameters calibrated during manufacturing. When the disk drive is powered on during normal operation, the calibrated data-sector channel parameters are read from the reserved sector(s) and used to program read channel circuit depending on the radial location of the head 4 with respect to the disk 2.

Programming the read channel circuit with calibrated channel parameters enables higher linear recording densities leading to an increase in the disk drive's overall storage capacity. However, when the disk drive is powered on initially, the calibrated channel parameters for reading the reserved sector(s) are unknown, and therefore the read channel circuit is initially programmed with nominal channel parameters. The nominal channel parameters, determined during manufacturing, are typically set to values which should work well for a family of disk drives on average. However, due to manufacturing process variations (e.g., variations in head sensitivity, fly height, media, embedded servo bursts, etc.), a percentage of the disk drives will not be able to read the reserved sector(s) using the nominal channel parameters. If the reserved sector(s) cannot be read, the disk drive may be discarded even though it may otherwise fall within acceptable tolerances. This leads to an undesirable reduction in manufacturing yield.

There is, therefore, a need to improve a disk drive's ability to read calibrated data-sector channel parameters stored in reserved sector(s) when the disk drive is powered on, thereby improving the manufacturing yield.

SUMMARY OF THE INVENTION

The present invention may be regarded as a disk drive comprising a disk with a reserved sector for storing a data-sector channel parameter, and a data sector for storing data. The disk drive further comprises a read channel circuit comprising a parameter register, and a non-volatile semiconductor memory (NSM) storing a reserved-sector channel parameter that is selected by using a parameter calibration procedure performed for the disk drive. A disk controller retrieves the reserved-sector channel parameter stored in the NSM, programs the parameter register with the retrieved reserved-sector channel parameter in order to configure the read channel circuit to recover the data-sector channel parameter stored in the reserved sector, and programs the parameter register with the recovered data-sector channel parameter so that the read channel circuit is configured to recover the data stored in the data sector.

The present invention may also be regarded as a method of manufacturing a disk drive comprising a head for writing data to and reading data from a disk, a non-volatile semiconductor memory (NSM), and a read channel for detecting an estimated data sequence from a read signal emanating from the head. A reserved-sector channel parameter is calibrated for recovering a calibrated data-sector channel parameter stored in a reserved sector. The data-sector channel parameter is calibrated for recovering data from a data sector. The calibrated data-sector channel parameter is written to the reserved sector, and the calibrated reserved-sector channel parameter is stored in the NSM.

The present invention may also be regarded as a method of reading data recorded in a disk drive comprising a head for writing data to and reading data from a disk, a non-volatile semiconductor memory (NSM), and a read channel for detecting an estimated data sequence from a read signal emanating from the head. The read channel is programmed with calibrated reserved sector read channel parameters stored in the NSM. A calibrated data-sector channel parameter is read from the reserved sector and stored in random access memory (RAM). The read channel is programmed with the calibrated data-sector channel parameter stored in RAM, and data is then read from a data sector.

DESCRIPTION OF THE PREFERRED EMBODIMENTS

Figure 2:
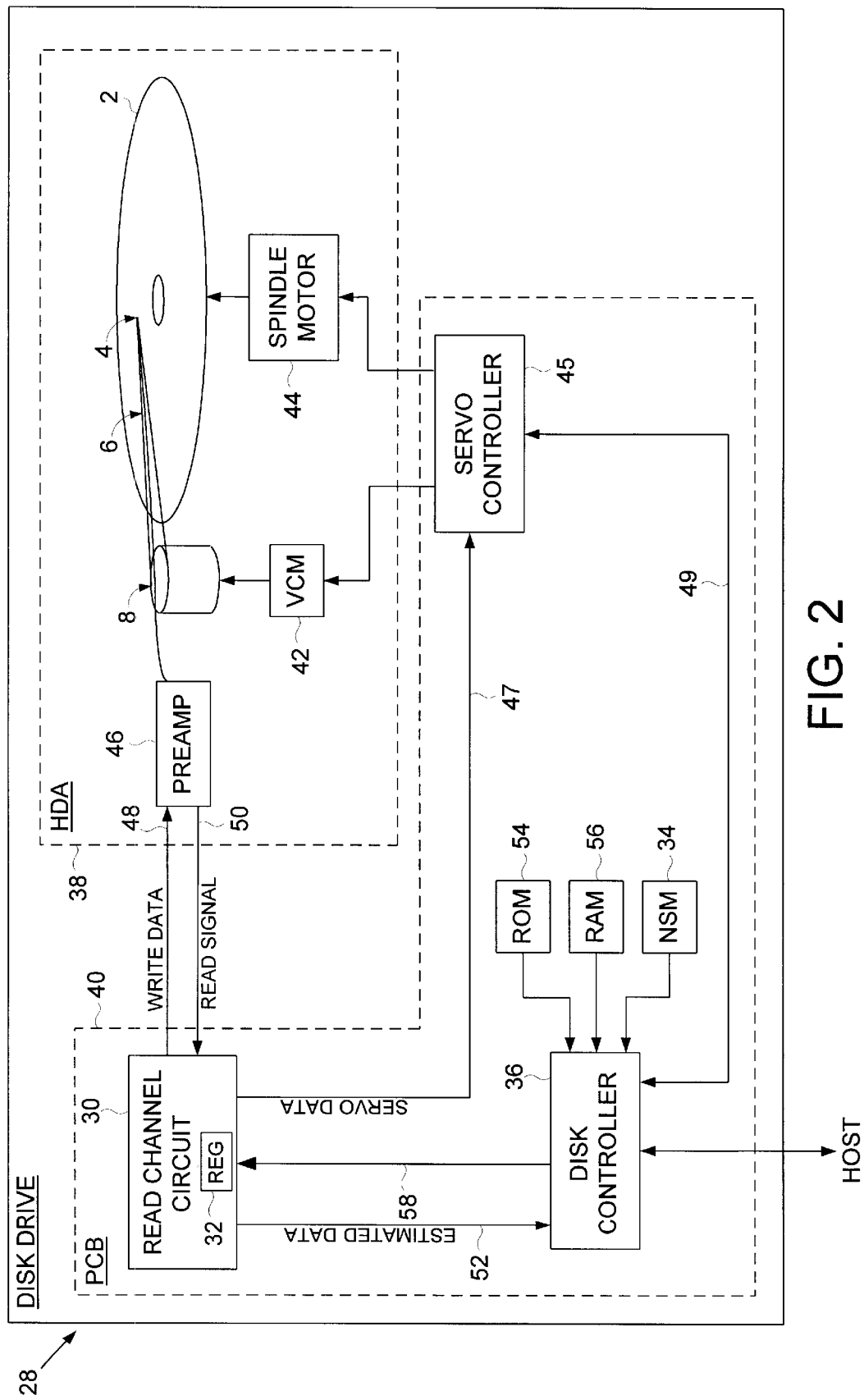
FIG. 2 is a disk drive according to an embodiment of the present invention comprising a read channel circuit and a re-writeable non-volatile semiconductor memory (NSM) for storing reserved-sector channel parameters.

FIG. 2 shows a disk drive 28 comprising a disk 2 with a reserved sector for storing a data-sector channel parameter, and a data sector for storing data. The disk drive 28 further comprises a read channel circuit 30 comprising a parameter register 32, and a non-volatile semiconductor memory NSM 34 storing a reserved-sector channel parameter that is selected by using a parameter calibration procedure performed for the disk drive 28. A disk controller 36 retrieves the reserved-sector channel parameter stored in the NSM 34, programs the parameter register 32 with the retrieved reserved-sector channel parameter in order to configure the read channel circuit 30 to recover the data-sector channel parameter stored in the reserved sector, and programs the parameter register 32 with the recovered data-sector channel parameter so that the read channel circuit 30 is configured to recover the data stored in the data sector.

In the disk drive 28 of FIG. 2, the disk 2 and head 4 are sealed within a head disk assembly (HDA) 38, and the read channel circuit 30 is mounted on a printed circuit board (PCB) 40. Also within the HDA 38 is a suitable voice coil motor (VCM) 42 for rotating the actuator arm 6 about the pivot 8, and a suitable spindle motor 44 for spinning the disk 2 about a spindle. The VCM 42 and spindle motor 44 are controlled by a suitable servo controller 45 (also mounted on the PCB 38) which is responsive to servo data 47 detected by the read channel circuit 30 as well as servo commands received over line 49 from the control system 36.

During a write operation, write data 48 is applied to a preamplifier circuit 46 within the HDA 38 which modulates a write current in the head 4 to record the write data 48 to the disk 2. During a read operation, the preamplifier amplifies an analog read signal emanating from the head 4 and supplies an amplified read signal 50 to the read channel circuit 30. The read channel circuit 30 detects an estimated data sequence 52 from the amplified read signal 50 using programmable circuitry, for example, using well known Partial Response Maximum Likelihood (PRML) circuitry. The estimated data sequence 52 is transferred to the disk controller 36 which may implement an error correction code (ECC) for correcting errors in the estimated data sequence 52. using the ECC symbols 26 of FIG. 1C.

The disk controller 36 executes the steps of a suitable computer program stored in a read only memory (ROM) 54. A random access memory (RAM) 56 stores program data which facilitates the execution of the computer program. As described in more detail below, in one embodiment the computer program includes steps to calibrate the data-sector channel parameters for programming register 32 in the read channel circuit 30 over line 58 before reading data from a data sector. In another embodiment, the computer program may include steps to calibrate the reserved-sector channel parameter stored in the NSM 34 for reading the data-sector channel parameters from the reserved sector.

The NSM 34 is implemented using a suitable memory device which retains the calibrated reserved-sector channel parameter when the disk drive 28 is powered down. In this manner, when the disk drive 28 is powered on the calibrated reserved-sector channel parameter is available for programming the read channel circuitry 30. This increases the manufacturing yield by increasing the probability of successfully reading the calibrated data-sector channel parameters stored in the reserved sector. In one embodiment, the NSM 34 is a re-writeable memory, such as an EEPROM or FLASH, which enables the disk drive 28 to calibrate and store the reserved-sector channel parameter using an internal calibration procedure. Manufacturing and operating embodiments of the disk drive 28 employing a NSM 34 are disclosed with reference to the flow diagrams shown in FIG. 3A and FIG. 3B.

Figure 3A:
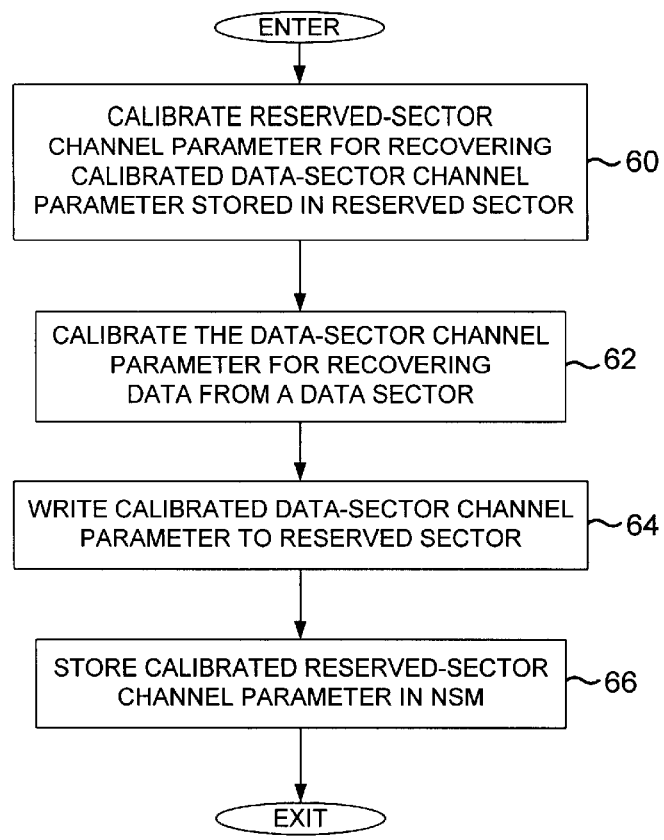
FIG. 3A is a flow diagram illustrating an embodiment of the present invention for manufacturing a disk drive by calibrating reserved-sector channel parameters and data-sector channel parameters, wherein the calibrated data-sector channel parameters are written to reserved sector(s) and the calibrated reserved-sector channel parameters are stored in the NSM of FIG. 2.
Figure 3B:
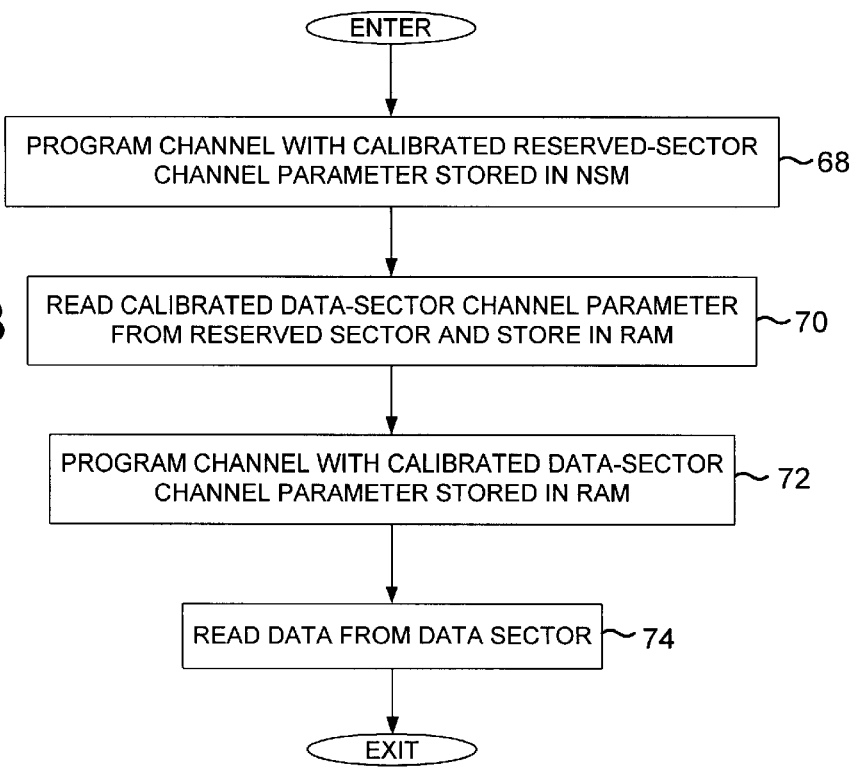
FIG. 3B is a flow diagram illustrating an embodiment of the present invention for reading data from a disk by programming the read channel of FIG. 2 with calibrated reserved-sector channel parameters stored in the NSM, reading calibrated data-sector channel parameters from the reserved sector(s), programming the read channel with the calibrated data-sector channel parameters, and reading data from a selected data sector.

The flow diagram of FIG. 3A is executed as part of the manufacturing process of the disk drive 28. At step 60 a reserved-sector channel parameter is calibrated for recovering a calibrated data-sector channel parameter stored in a reserved sector, and at step 62 a data-sector channel parameter is calibrated for recovering data from a data sector. Example channel parameters that may be calibrated include timing and gain parameters, such as filter coefficients in feedback loops, and initial coefficient values for an adaptive discrete-time equalizer employed in the read channel circuit 30. The channel parameters (reserved-sector and data-sector) are calibrated using a suitable calibration procedure which, for example, determines the parameter values which minimize a quality metric (e.g., squared sample errors). The quality metric may be measured by writing and reading a known test pattern to the disk at the sector of interest. The calibration procedure may be implemented using external instrumentation, or it may be implemented using an internal calibration program executed by the disk controller 36 within the disk drive 28 as is well known in the art.

At step 64 the calibrated data-sector channel parameter is written to the reserved sector, and at step 66 the calibrated reserved-sector channel parameter is stored in the NSM 34. When the disk drive is initially powered on, the disk controller 36 retrieves the calibrated reserved-sector channel parameters from the NSM 34 and programs register 32 in the read channel circuit 30. The calibrated data-sector channel parameters stored in the reserved sector are then recovered and stored in the RAM 56. This process is understood with reference to the flow diagram of FIG. 3B.

At step 68 the disk controller 36 retrieves the calibrated reserved-sector channel parameters stored in the NSM 34 and programs register 32 within the read channel circuit 30. Then at step 70 the read channel circuit 30 operates to read the calibrated data-sector channel parameter stored in the reserved sector, where the calibrated data-sector channel parameter is stored in the RAM 56. Before reading data from a selected data sector, at step 72 the disk controller 36 programs register 32 of the read channel circuit 30 with the corresponding calibrated data-sector channel parameter stored in the RAM 56. At step 74 the read channel circuit 30 operates to read data stored in the selected data sector using the calibrated data-sector channel parameter.

Figure 1A:
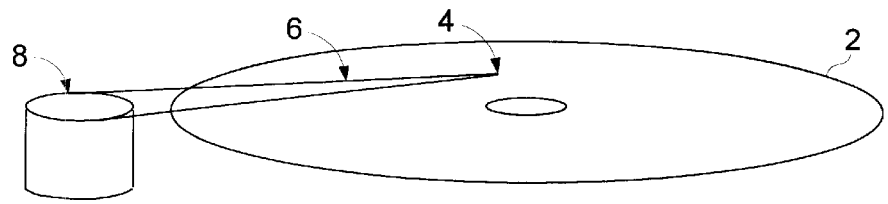
FIG. 1A shows a disk for storing data and a head actuated radially over the disk for writing and reading data.
Figure 1B:
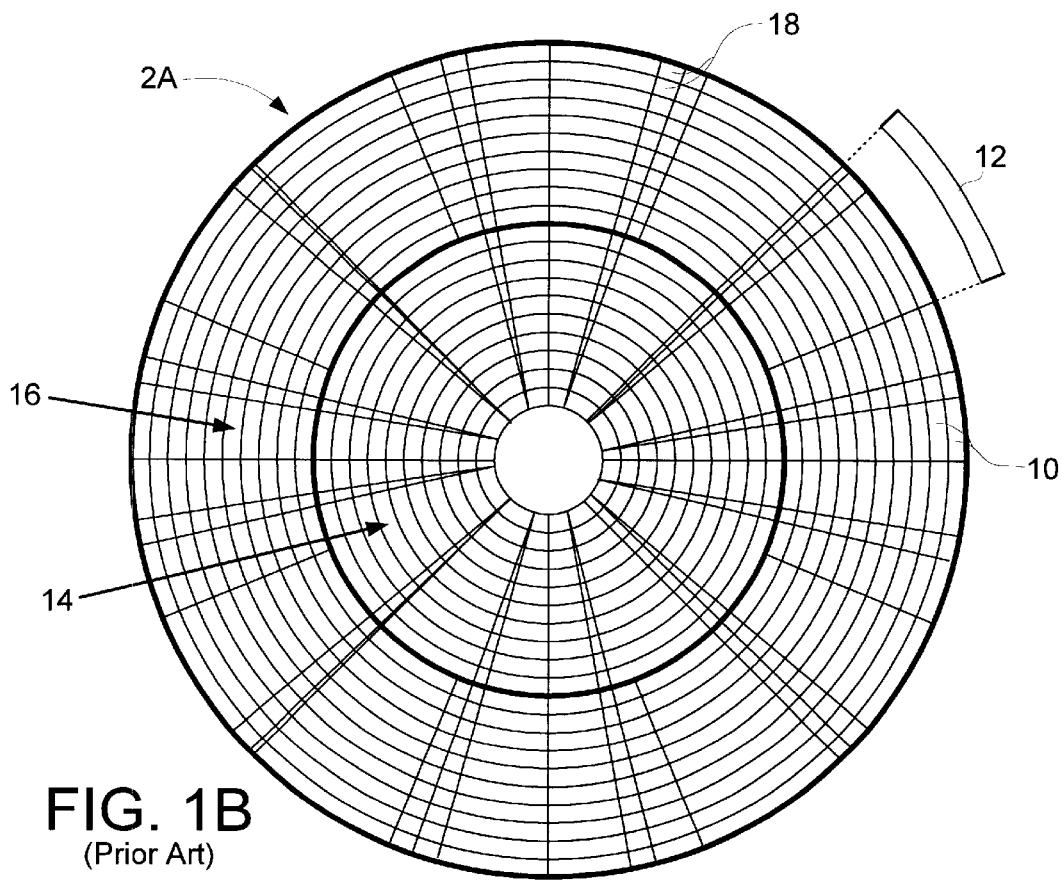
FIG. 1B shows an example format of a disk comprising a plurality of concentric tracks partitioned into a plurality of data sectors, wherein the tracks are banded together to form zones and at least on of the sectors is reserved for storing calibrated data-sector channel parameters.
Figure 1C:
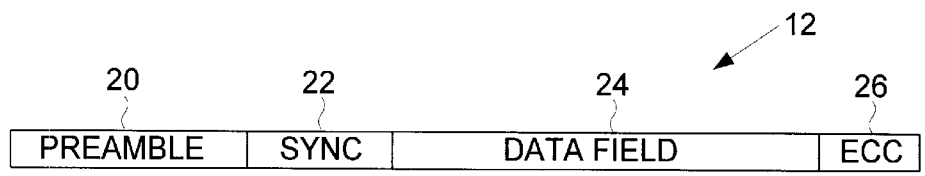
FIG. 1C shows an example format of a data sector comprising a preamble, a sync mark, a data field, and appended ECC symbols.

In one embodiment of the present invention, the reserved sector stores calibrated data-sector channel parameters corresponding to each zone on the disk 2 (e.g., the inner zone 14 and outer zone 16 illustrated in FIG. 1B). When the disk drive 28 is initially powered on, all of the calibrated data-sector channel parameters are recovered from the reserved sector and stored in the RAM 56. When the head 4 crosses over into a new zone during normal operation, the disk controller 36 recovers the appropriate calibrated data-sector channel parameters from the RAM 56 and programs the read channel circuit 30 for operation in the new zone.

In another embodiment, only a subset of the calibrated data-sector channel parameters are recovered from the reserved sector and stored in the RAM 56 at any given time. As the radial location of the head 4 changes with respect to the disk, different calibrated data-sector channel parameters are recovered from the reserved sector and stored in the RAM 56. This embodiment reduces the necessary size and cost of the RAM 56 relative to the subset size.

We claim:

1. A disk drive comprising:
   (a) a disk comprising:
      a reserved sector for storing a data-sector channel parameter; and
      a data sector for storing data;
   (b) a read channel circuit comprising a parameter register;
   (c) a non-volatile semiconductor memory (NSM) storing a reserved-sector channel parameter that is selected by using a parameter calibration procedure performed for the disk drive; and
   (d) a disk controller for retrieving the reserved-sector channel parameter stored in the NSM, programming the parameter register with the retrieved reserved-sector channel parameter in order to configure the read channel circuit to recover the data-sector channel parameter stored in the reserved sector, and programming the parameter register with the recovered data-sector channel parameter so that the read channel circuit is configured to recover the data stored in the data sector.

2. The disk drive as recited in claim 1, wherein the NSM is a re-writeable memory.

3. The disk drive as recited in claim 1, further comprising a read only memory (ROM) for storing the steps of a calibration program, wherein the disk controller executes the steps of the calibration program to facilitate the parameter calibration procedure performed for the disk drive for selecting the reserved-sector channel parameter.

4. The disk drive as recited in claim 1, further comprising a random access memory (RAM), wherein:
   a. the disk comprises a plurality of concentric tracks, each concentric track is partitioned into a plurality of data sectors, and the concentric tracks are banded together to form at least an inner zone and an outer zone;
   b. the reserved sector stores an inner zone data-sector channel parameter calibrated for reading data from the inner zone, and an outer zone data-sector channel parameter calibrated for reading data from the outer zone;
   c. the inner zone data-sector channel parameter and the outer zone data-sector channel parameter are recovered from the reserved sector and stored in the RAM;
   d. the disk controller programs the parameter register with the inner zone data-sector channel parameter stored in the RAM to configure the read channel circuit to recover data from the inner zone; and
   e. the disk controller programs the parameter register with the outer zone data-sector channel parameter stored in the RAM to configure the read channel circuit to recover data from the outer zone.

5. A method of manufacturing a disk drive comprising a head for writing data to and reading data from a disk, a non-volatile semiconductor memory (NSM), and a read channel for detecting an estimated data sequence from a read signal emanating from the head, the method of manufacturing comprising the steps of:
   a. calibrating a reserved-sector channel parameter for recovering a calibrated data-sector channel parameter stored in a reserved sector;
   b. calibrating the data-sector channel parameter for recovering data from a data sector;
   c. writing the calibrated data-sector channel parameter to the reserved sector; and
   d. storing the calibrated reserved-sector channel parameter in the NSM.

6. A method of reading data recorded in a disk drive comprising a head for writing data to and reading data from a disk, a non-volatile semiconductor memory (NSM), and a read channel for detecting an estimated data sequence from a read signal emanating from the head, the method of reading data comprising the steps of:
   a. programming the read channel with a calibrated reserved-sector channel parameter stored in the NSM;
   b. reading a calibrated data-sector channel parameter from a reserved sector and storing the calibrated data-sector channel parameter in a random access memory (RAM);
   c. programming the read channel with the calibrated data-sector channel parameter stored in the RAM; and
   d. reading data from a data sector.

7. The method as recited in claim 6, wherein the NSM is a re-writeable memory.

8. The method as recited in claim 6, wherein the disk drive further comprises a read only memory (ROM) for storing the steps of a calibration program, further comprising the step of executing the calibration program to calibrate the reserved-sector channel parameter.

9. The method as recited in claim 6, wherein:
   the disk comprises a plurality of concentric tracks, each concentric track is partitioned into a plurality of data sectors, and the concentric tracks are banded together to form at least an inner zone and an outer zone; and
   the reserved sector stores an inner zone data-sector channel parameter calibrated for reading data from the inner zone, and an outer zone data-sector channel parameter calibrated for reading data from the outer zone, further comprising the steps of:
   a. reading from the reserved sector the inner zone data-sector channel parameter and the outer-zone data sector channel parameter;
   b. storing in the RAM the inner zone data-sector channel parameter and the outer zone data-sector channel parameter;
   c. programming the parameter register with the inner zone data-sector channel parameter stored in the RAM to configure the read channel circuit to recover data from the inner zone; and d. programming the parameter register with the outer zone data-sector channel parameter stored in the RAM to configure the read channel circuit to recover data from the outer zone.

\* \* \* \* \*